(12) United States Patent
Walters et al.

(10) Patent No.: US 10,988,094 B2
(45) Date of Patent: Apr. 27, 2021

(54) TEXTURED COHERENT REFLECTION COMPONENT

(71) Applicant: Lacks Enterprises, Inc., Grand Rapids, MI (US)

(72) Inventors: David Walters, Caledonia, MI (US); Thomas Hawkins, Lowell, MI (US)

(73) Assignee: LACKS ENTERPRISES, INC., Grand Rapids, MI (US)

( * ) Notice: Subject to any disclaimer, the term of this patent is extended or adjusted under 35 U.S.C. 154(b) by 0 days.

(21) Appl. No.: 16/451,874

(22) Filed: Jun. 25, 2019

(65) Prior Publication Data

US 2019/0389412 A1    Dec. 26, 2019

Related U.S. Application Data

(60) Provisional application No. 62/690,259, filed on Jun. 26, 2018.

(51) Int. Cl.
| | |
|---|---|
| *B60R 19/52* | (2006.01) |
| *F21S 41/37* | (2018.01) |
| *F21S 41/33* | (2018.01) |
| *F21V 7/28* | (2018.01) |
| *F21V 7/04* | (2006.01) |
| *F21W 104/00* | (2018.01) |

(52) U.S. Cl.
CPC ............ *B60R 19/52* (2013.01); *F21S 41/337* (2018.01); *F21S 41/37* (2018.01); *F21V 7/048* (2013.01); *F21V 7/28* (2018.02); *F21W 2104/00* (2018.01)

(58) Field of Classification Search
CPC ... B60R 2019/525; B60R 19/52; F21S 41/337
USPC .......................................................... 362/488
See application file for complete search history.

(56) References Cited

U.S. PATENT DOCUMENTS

| | | | | |
|---|---|---|---|---|
| 10,059,256 | B1* | 8/2018 | Diedrich | B60Q 1/2661 |
| 2007/0058382 | A1* | 3/2007 | Lan | B60Q 1/2661 |
| | | | | 362/487 |
| 2009/0072556 | A1* | 3/2009 | Kudelko | B60R 19/52 |
| | | | | 293/115 |
| 2009/0175047 | A1* | 7/2009 | Tsai | B60Q 1/0041 |
| | | | | 362/487 |
| 2011/0005851 | A1* | 1/2011 | Doroghazi | B60R 13/0838 |
| | | | | 180/68.1 |

(Continued)

*Primary Examiner* — Christopher M Raabe
(74) *Attorney, Agent, or Firm* — Dickinson Wright PLLC

(57) ABSTRACT

A trim component, such as a grill of a vehicle, includes a substrate having a 3-dimensional shape and defining a disrupted reflective surface including a plurality of facets over a curved surface. Each of the facets is configured to reflect an incident light beam in a common direction, for example, toward a given target. A reflective coating, such as a chrome plating layer, overlies the disrupted reflective surface. The facets may have similar shapes and/or be arranged in a repeating pattern, but with one or more irregular features. The sizes, shapes, and/or orientation direction of the facets may varying in a gradient based on the curvature of the curved surface. The trim component also includes a light source to illuminate the disrupted reflective surface. The light source may be hidden so it is not directly visible to a viewer, but instead is reflected by the disrupted reflective surface.

25 Claims, 11 Drawing Sheets

(56) References Cited

U.S. PATENT DOCUMENTS

| | | | |
|---|---|---|---|
| 2013/0293104 A1* | 11/2013 | Wu | B60R 19/52 |
| | | | 315/77 |
| 2015/0118442 A1* | 4/2015 | Chase | B62D 29/005 |
| | | | 428/141 |
| 2016/0090027 A1* | 3/2016 | Tanaka | B60Q 1/2661 |
| | | | 362/516 |
| 2019/0271458 A1* | 9/2019 | Brown | F21S 41/285 |
| 2019/0293257 A1* | 9/2019 | Herrmann | B60Q 1/2619 |

* cited by examiner

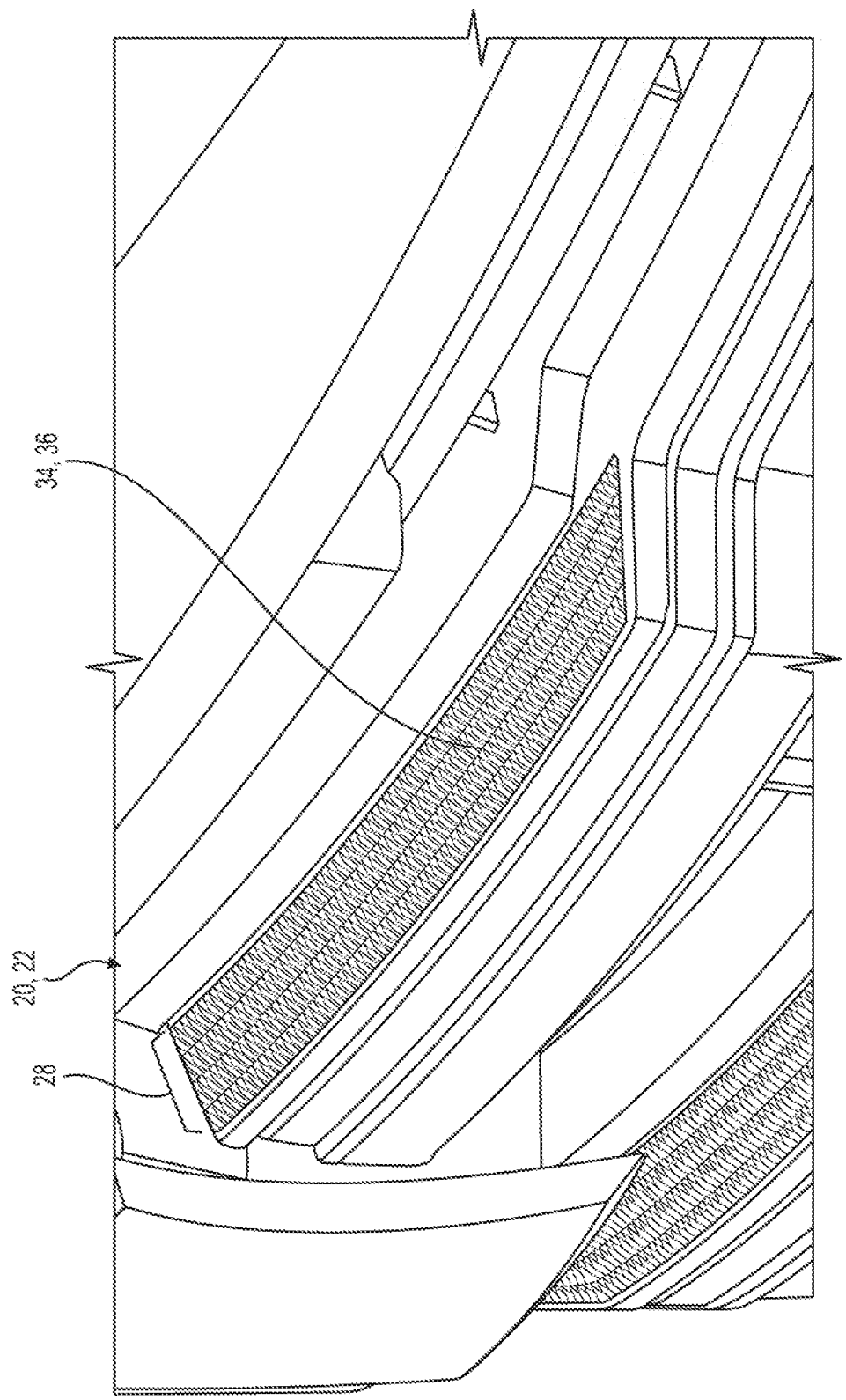

TEXTURED COHERENT REFLECTION COMPONENT

CROSS-REFERENCE TO RELATED APPLICATIONS

This application claims the benefit of U.S. Provisional Application No. 62/690,259 filed Jun. 26, 2018. The entire disclosure of the above application is incorporated herein by reference.

BACKGROUND OF THE INVENTION

1. Field of the Invention

A trim component with an integrated reflective lighting feature is provided.

2. Discussion

The automotive industry is increasingly interested in incorporating metalized plastic parts into vehicles. Industry is also increasingly interested in providing trim components that provide unique finishes and/or visual effects.

SUMMARY OF THE INVENTION

It would be advantageous to provide a trim component providing integrated reflective lighting features. During daylight, it is desirable to have a decorative automotive trim component that is aesthetically appealing. At night, it is desirable to add cosmetic lighting to this trim component. It is further desirable to have the light appear from a non-obvious source or a source hidden from the observer.

The present disclosure provides for a trim component, such as a grill for a vehicle, that includes a disrupted reflective surface with a plurality of facets incorporated into a molded plastic surface which, after metallization, are designed to reflect light in a predetermined direction. The facets are molded over a 3-dimensional surface and vary in angle and/or size to reflect light in a given direction. In this way, the disrupted reflective surface provides an aesthetically appealing finish in bright ambient conditions, and which also functions to direct cosmetic lighting in a specific direction when illuminated by an integrated light source.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1B is an enlarged portion of the part of FIG. 1A;

DESCRIPTION OF THE ENABLING EMBODIMENTS

Figure 1A:
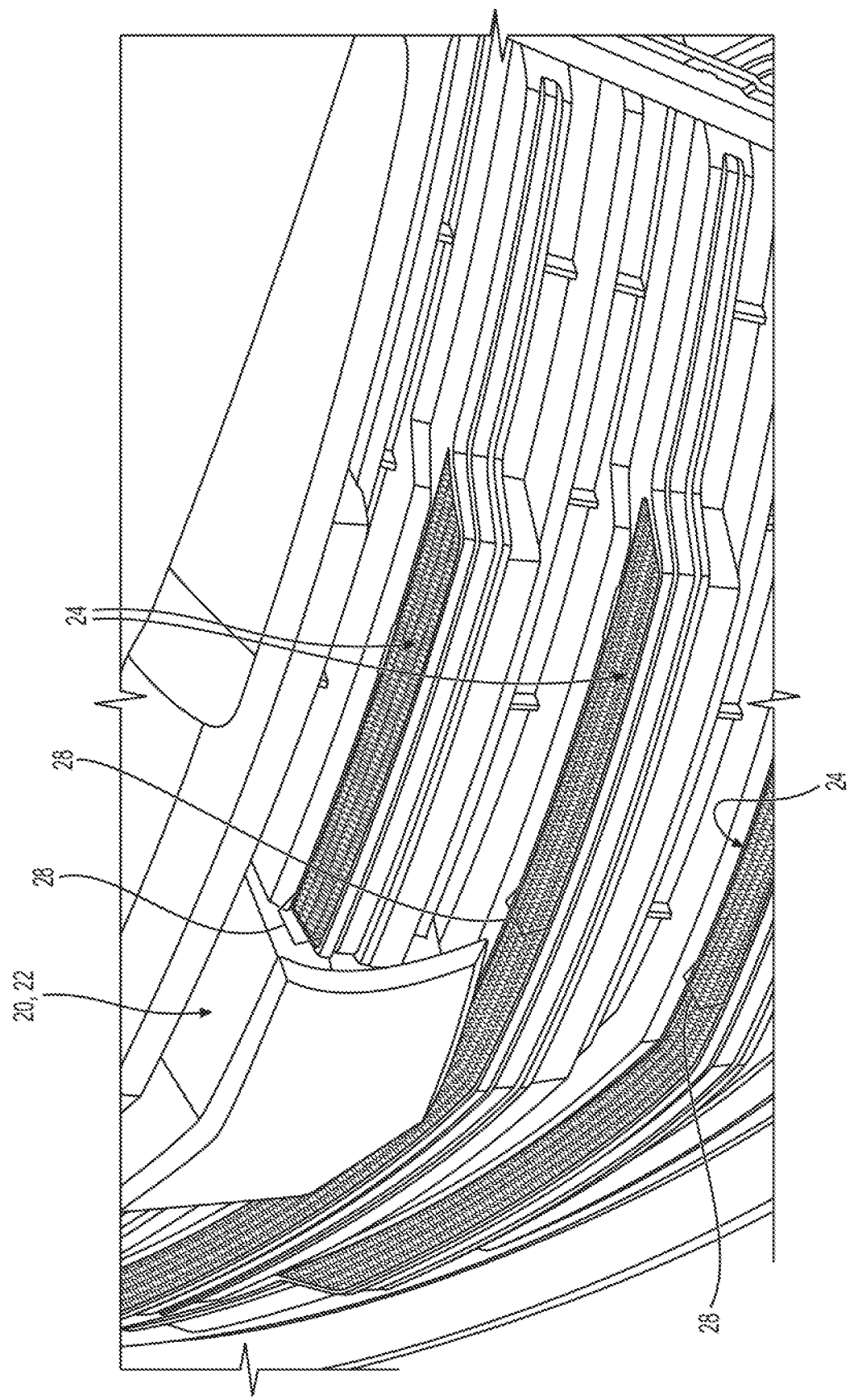
FIG. 1A is an profile view of a trim component from an elevated perspective according to an aspect of the present disclosure.
Figure 1C:
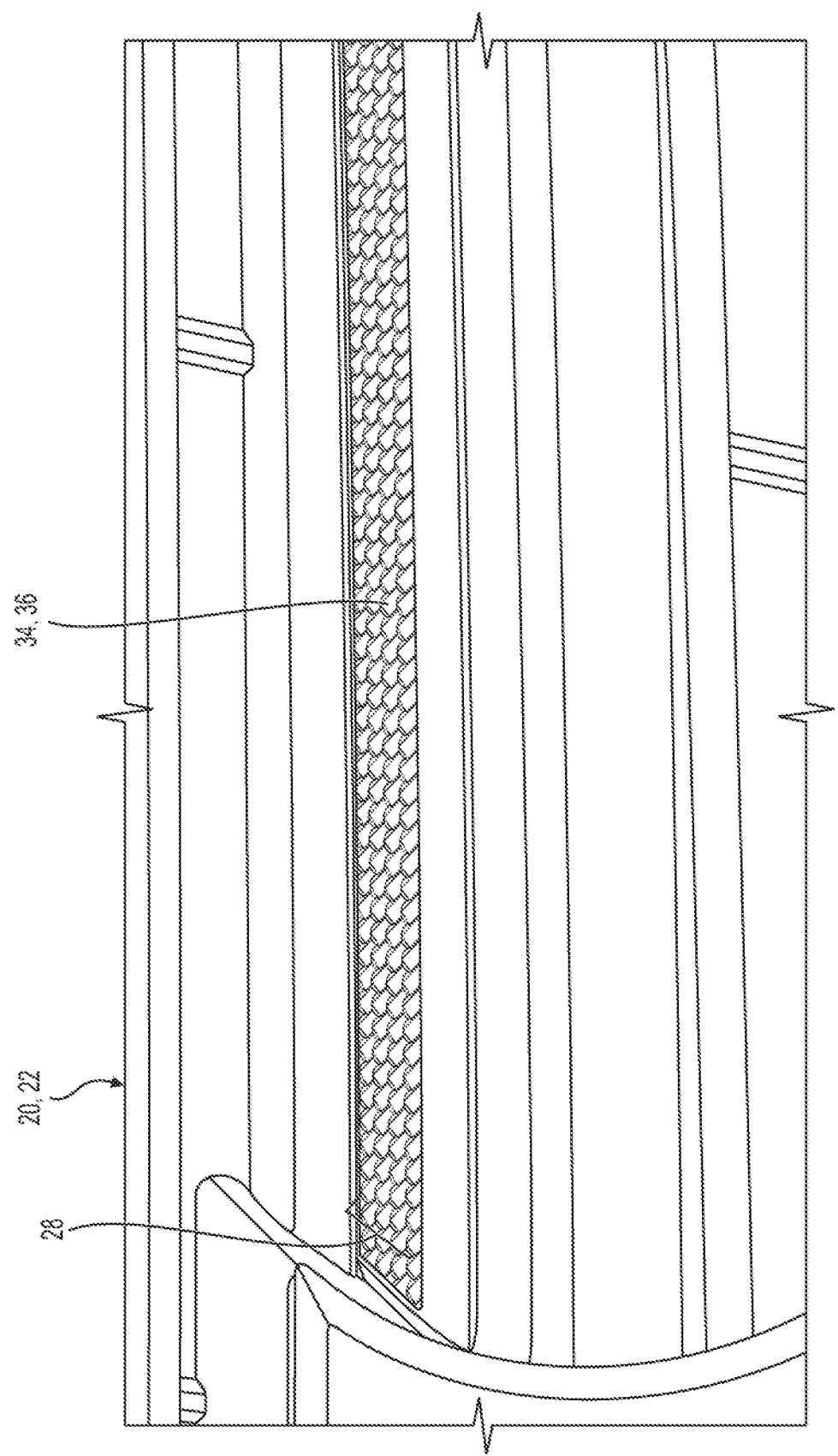
FIG. 1C is another enlarged portion of the part of FIG. 1A.

Referring to the Figures, wherein like numerals indicate corresponding parts throughout the several views, a trim component 20 is provided. As shown in FIGS. 1A-1C, 2, and 3, the trim component 20 may be a decorative exterior component for a vehicle, such as a grill of a vehicle. The subject trim component 20 may be used in a vehicle interior or for other applications, such as household devices and/or building construction materials.

The trim component 20 includes a substrate 22 having a 3-dimensional shape and defining a disrupted reflective surface 34 including a plurality of facets 36 over a curved surface 28. In some embodiments, the curved surface 28 may have a curve, such as a convex, concave, or a complex curve. In other embodiments, the disrupted reflective surface 34 may be flat or generally flat. For example, the facets 36 may be integrally formed in the substrate 22 and may be formed by the molding of the substrate 22. Each of the facets 36 is configured to maximize reflection of an incident light beam 44 in a common direction, for example, toward a given target. A reflective coating 48, such as a chrome plating layer, overlies the disrupted reflective surface 34. The reflective coating 48 may be an electroplated chrome, although other types of reflective coatings 48 may be used such as a Physical Vapor Deposition (PVD) coating, a hot-stamp film, or an insert-molded film. The substrate 22 may be made of a material that includes one or more of Acrylonitrile Butadiene Styrene (ABS), a blend of Polycarbonate with ABS (PC-ABS), a blend of ABS with Polycarbonate (ABS-PC), Polyamide, and/or Aramid. In some embodiments, the substrate 22 may be injection molded.

According to another aspect of the disclosure, the facets 36 may be irregular, with each of the facets 36 having an orientation direction that is dependent on a desired diffusion of light reflected therefrom and on the orientation of a curvature of the curved surface 28 thereunder. For example, the facets 36 may be progressively tilted by different degrees, such that each of the facets 36 is oriented to provide the maximum directional reflection toward a given target of light from a predetermined source. The facets 36 may also be configured minimize reflection from directions or sources except for the predetermined source. The facets 36 may have similar shapes and/or be arranged in a repeating pattern, but with one or more irregular features. According to an aspect of the disclosure, the facets 36 may be irregular, with sizes varying in a size gradient based on the curvature of the curved surface 28. For example, the facets 36 may progressively vary from smallest to largest or from largest to smallest.

Figure 2:
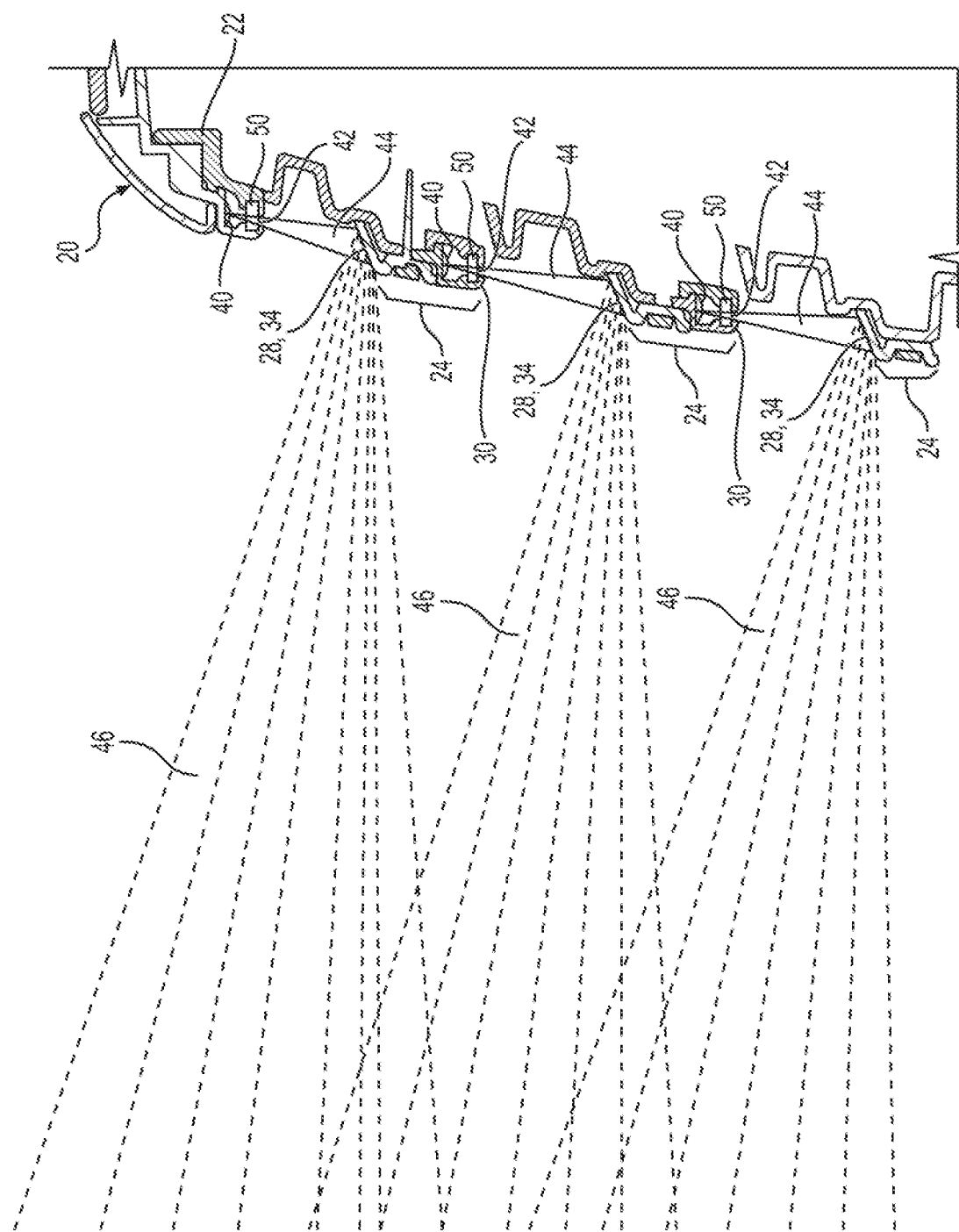
FIG. 2 is a cut-away side view of a trim component according to another aspect of the present disclosure.

According to another aspect of the disclosure, the trim component 20 further includes a light source 40 configured to illuminate the disrupted reflective surface 34. The light source 40 may include, for example, one or more LEDs, incandescent lights, lasers, or other devices capable of producing visible light. As shown in FIG. 2, the light source 40 may produce and direct an incident light beam 44 upon the disrupted reflective surface 34, which reflects therefrom as a reflected light beam 46. In some embodiments, the light source 40 may be a diffuse light source, producing the incident light beam 44 which spreads out over a relative wide area of the disrupted reflective surface 34. Alternatively, the light source 40 may be a focused light source, producing the incident light beam 44 which does not spread out over wide area of the disrupted reflective surface 34 and which is directed to a relative narrow area of the disrupted reflective surface 34. The light source 40 may include one or more optical elements 50 such as lenses and/or diffusers to distribute light across the disrupted reflective surface 34 or to focus light upon a specific area of the disrupted reflective surface 34.

The light source 40 may produce light having a single, predetermined color, such as white. Alternatively, the light source 40 may produce several different colors of light at the same time and/or at different times. In some embodiments, the light source 40 may be configured to vary in intensity and/or color over time according to a sequence. For example, the light source 40 may cycle through different colors and/or different intensities over a period of time that is sufficiently long enough for a viewer to perceive the different intensity and/or colors being produced. The sequence or cycle may include two or more different colors. In some embodiments, multi-color effects may be produced with different regions of the disrupted reflective surface 34 having different colors at the same time and/or at different times. In one example, the light source 40 may generate a multi-color light pattern upon the disrupted reflective surface 34, with each of the different colors being visible simultaneously, and with different colored portions of the disrupted reflective surface 34 varying in color, location, and/or intensity over time.

Figure 4:
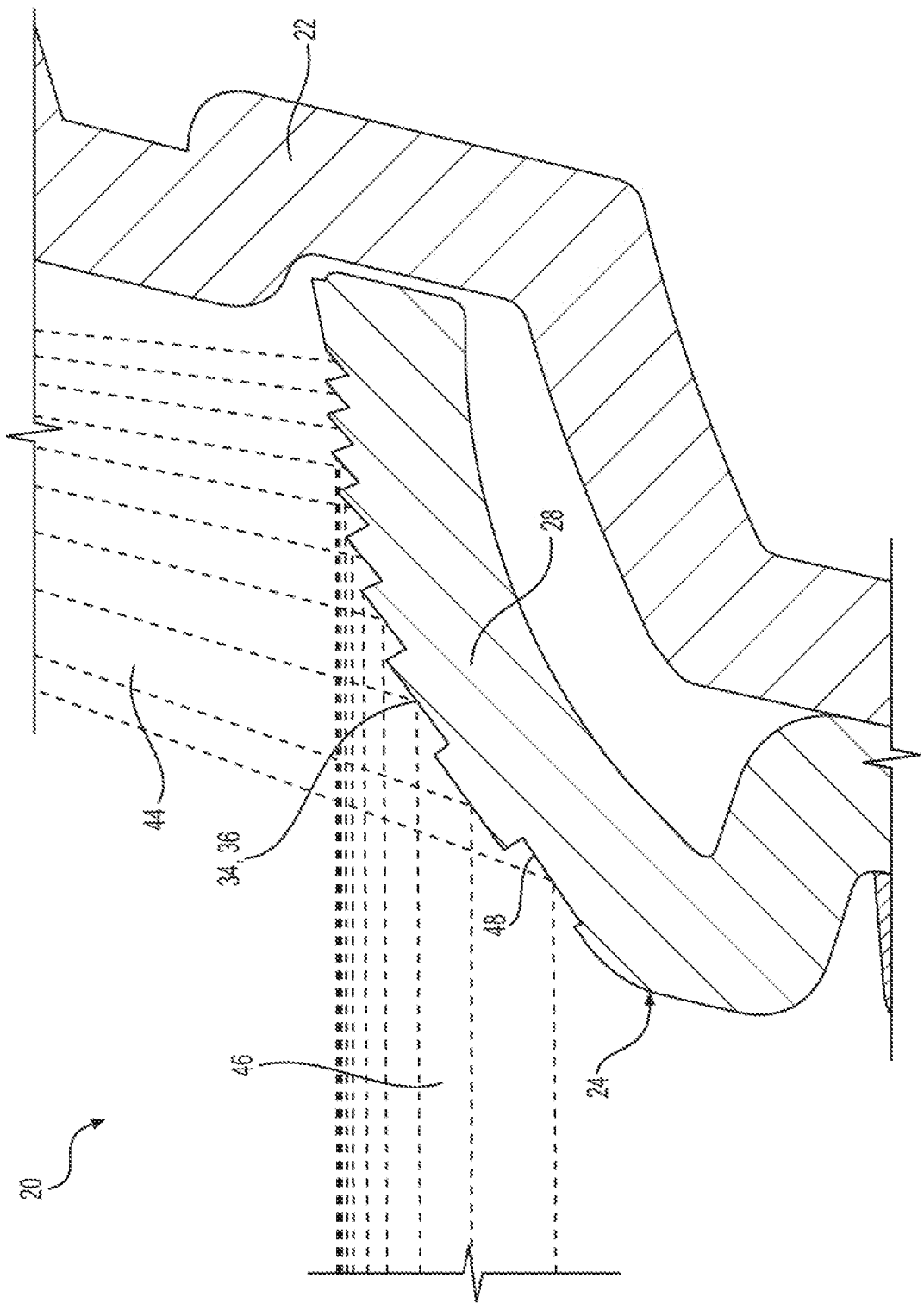
FIG. 4 is a cut-away side view of a trim component according to another aspect of the present disclosure.

The facets 36 could be configured as sweeping planes across the curved surface to maximize the reflected light to the target. An example of such an arrangement is shown in the cross-section of FIG. 4. The direction of each facet 36 may be dependent on the level of diffusion desired for the reflected light beam 46 and the curvature of the curved surface 28. The design and orientation of the facets 36 may be mathematically determined during the design stage, with the design being unique to the individual component 20. The facets 36 may be formed together with the rest of the substrate, for example by molding or casting the substrate. The facets 36 can be made reflective by a number of techniques as discussed above.

Figure 3:
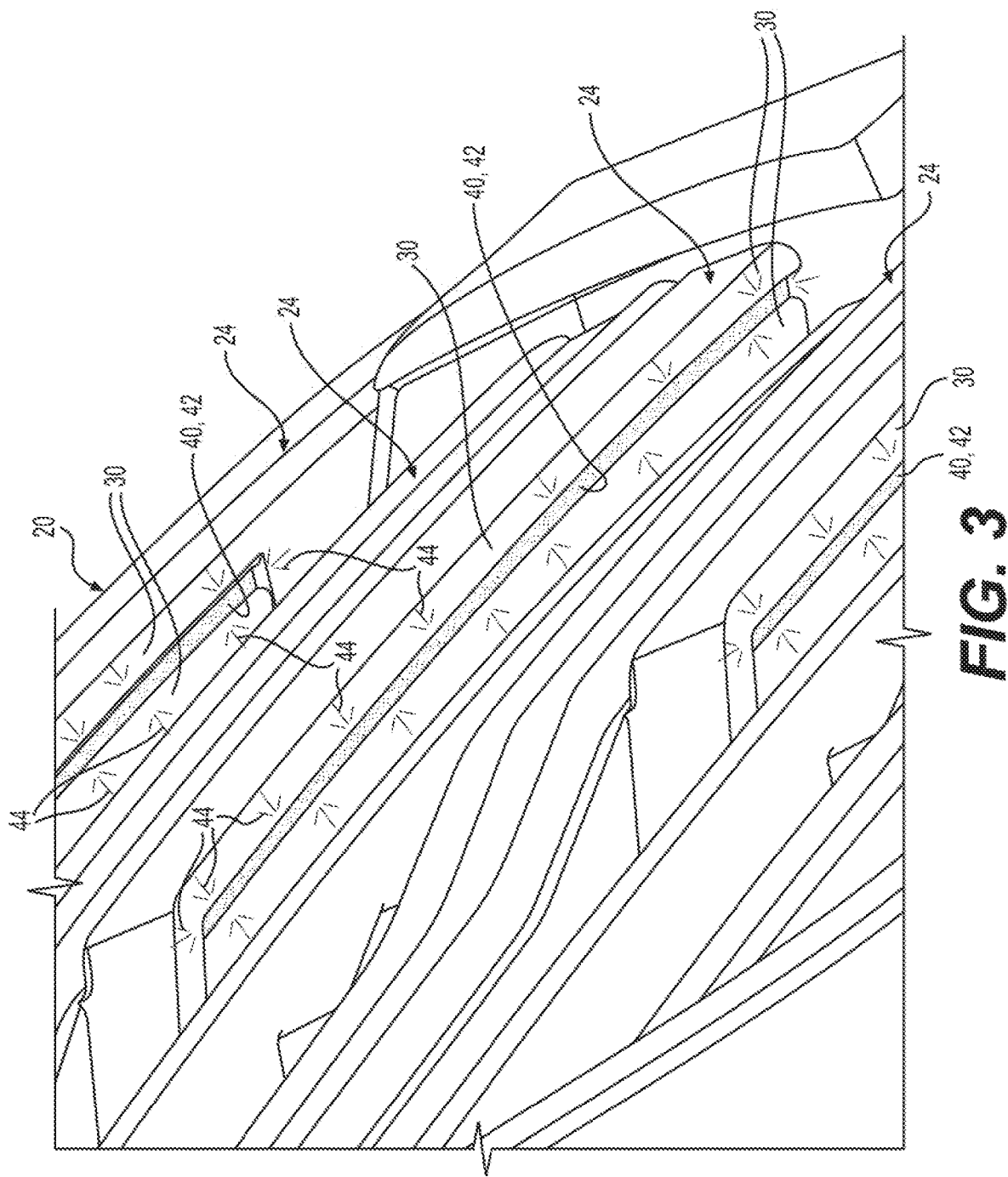
FIG. 3 is profile view of a trim component from a lower perspective according to an aspect of the present disclosure.

In some embodiments, and as shown in FIGS. 2-3, the trim component 20 may have a 3-dimensional shape including a plurality of protruding structures 24 extending outwardly. The protruding structures 24 may define the curved surfaces 28. Alternatively or additionally, light sources 40 may be disposed within the protruding structures 24. For example, as shown in the cross-section of FIG. 2, the light sources 40 may project the incident light beam 44 out from an aperture 42 in the trim component 20. In some embodiments, and as shown in FIG. 3, the trim component 20 may include a plurality of apertures 42, each shaped as a long, thin strip. FIG. 3 includes lines representing incident light beams 44. To simplify the drawings the lines representing the incident light beams 44 are shown projecting from the light sources 40, with some of the lines representing the incident light beams 44 being labeled. However, incident light 44 may project from any or all of the light sources 40 at any given time.

In some embodiments, the light source 40 may be configured be directly visible to a viewer. In other embodiments, the light source 40 may be configured to not be directly visible to a viewer. For example, and as shown in FIG. 3, the light source 40 may be located on or within a concealed surface 30 at the underside of an overhanging portion of the trim component 20. In some embodiments, light source 40 may be recessed within the substrate 22 and configured to project the incident light beam 44 out through the concealed surface 30 of the trim component 20. More specifically, and as shown in FIGS. 2-3, one or more of the concealed surfaces 30 may define the apertures 42 for projecting light from the light sources 40 that are recessed within the protruding structures 24 of the trim component 20. Thus, direct light from the light source 40 may be not directly visible to a viewer, making the reflected light beam 46 stand out and providing a visually appealing effect. Although visible from the perspective illustrated in FIG. 3, the light source 40 would not be visible from a perspective of an intended viewer, who may be located directly in front of or at an elevated position relative to the trim component 20. Therefore, lighting provided by the light source 40 may enhance the look of the metallized trim component 20, making it more visible while reducing back reflection from other sources. Other configurations or devices, such as shrouding, may be used to prevent the light source 40 from being directly visible to the viewer.

Figure 5:
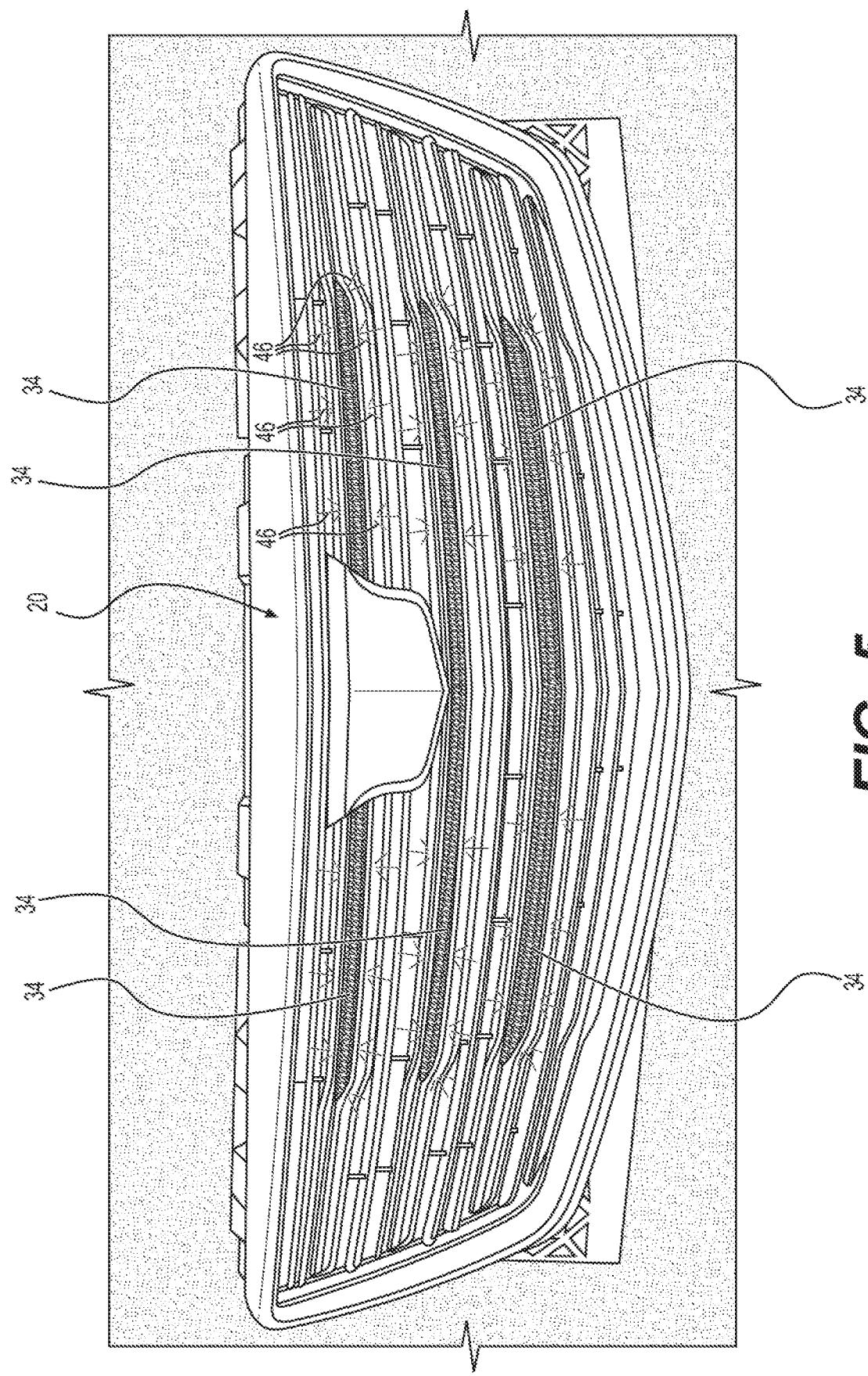
FIG. 5 is a front view of a trim component in a dark environment according to another aspect of the present disclosure.
Figure 6:
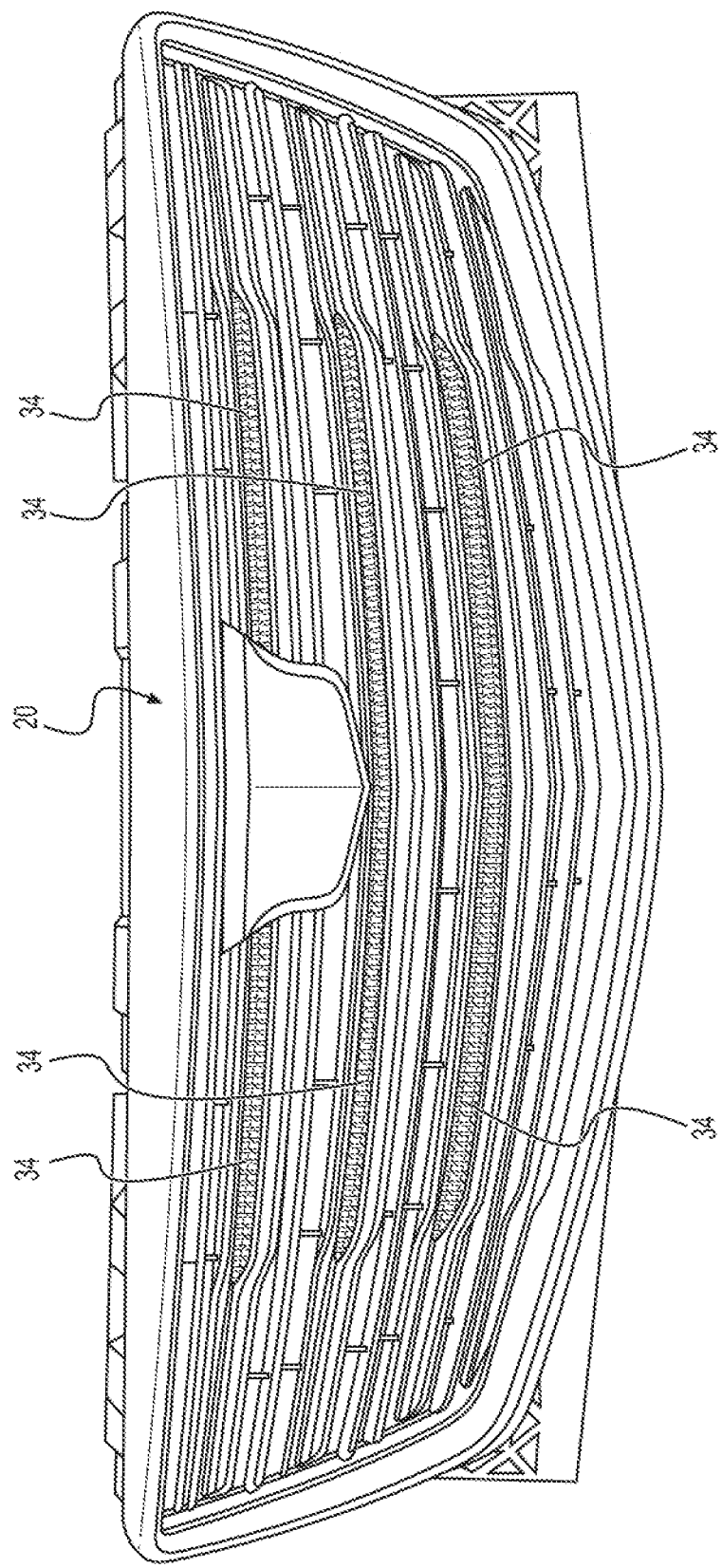
FIG. 6 is a front view of a trim component in a bright environment and without a light source being activated according to another aspect of the present disclosure.
Figure 7A:
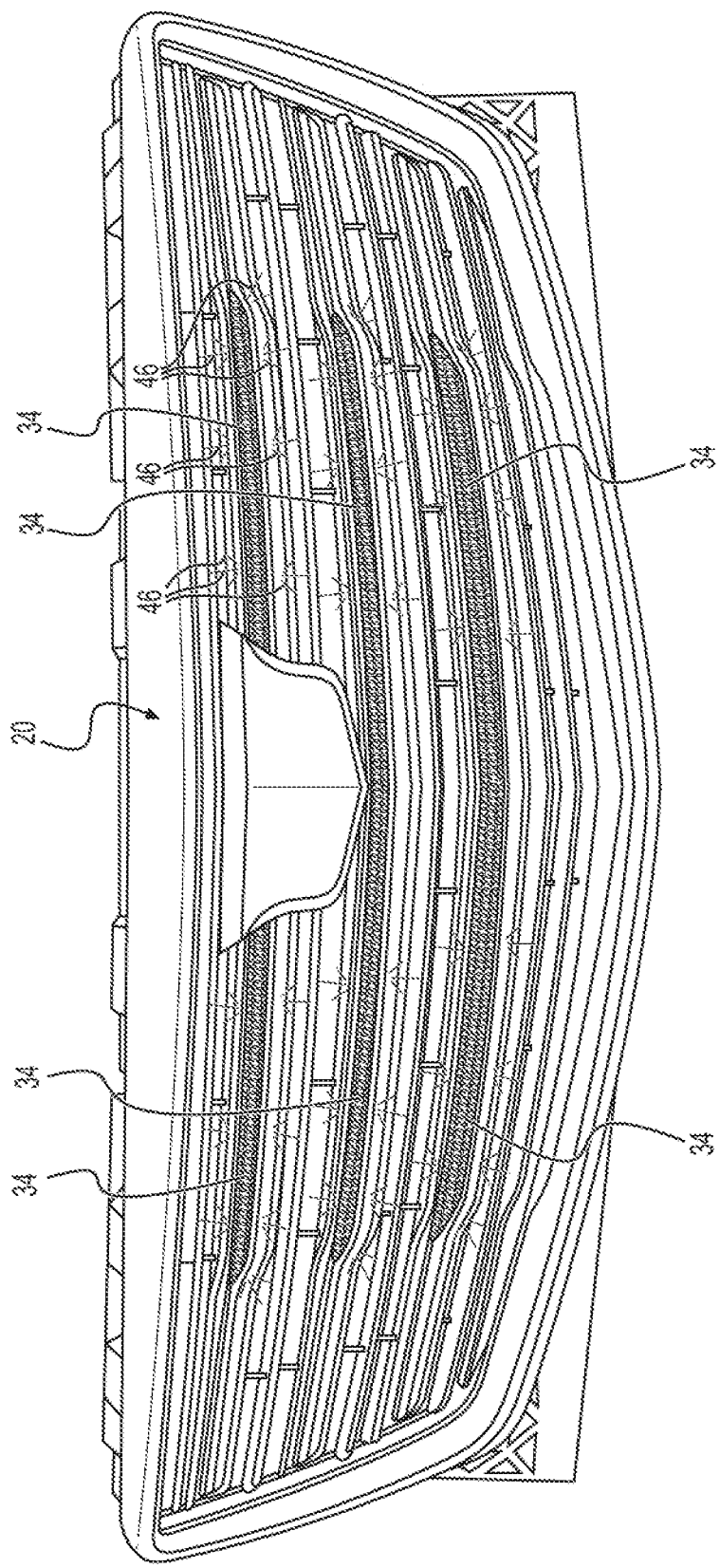
FIG. 7A is a front view of a trim component in a bright environment and with a light source being activated according to another aspect of the present disclosure.
Figure 7B:
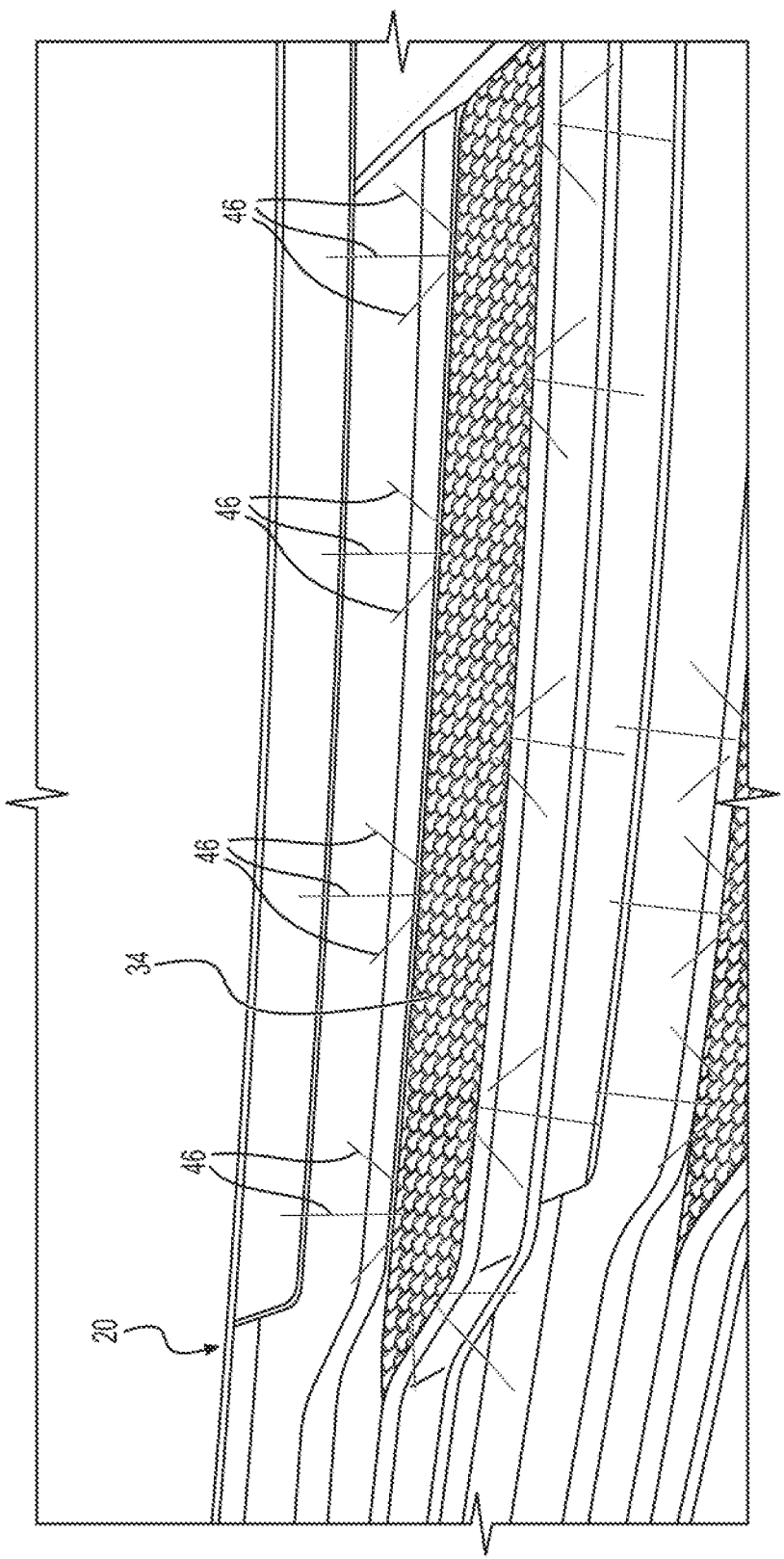
FIG. 7B is an enlarged portion of the trim component of FIG. 7A.

As shown in the example of FIG. 5, the disrupted reflective surface 34 may appear brightly illuminated by the light source 40 and in a dark ambient area, such as in use at night. As shown in the example of FIG. 6, the disrupted reflective surface 34 may appear to have some bright shiny texture when not illuminated by the light source 40 with bright ambient lighting, such as in daylight viewing. FIGS. 7A and 7B show the disrupted reflective surface 34 with bright ambient lighting, and with direct illumination by the integrated light source 40, making the disrupted reflective surface 34 stand-out as being especially bright. FIGS. 5, 7A and 7B each include lines representing the reflected light beams 46. To simplify the drawings the lines representing the reflected light beams 46 are shown at some locations on the disrupted reflective surfaces 34, with some of the lines representing the reflected light beams 46 being labeled. However, reflected light 46 may reflect from any or all of the disrupted reflective surface 34 at any given time.

According to another aspect, the facets 36 may be 3-dimensional structures having two or more different faces, with the faces having different reflectivity, or different gloss levels. For example, the facets 36 may be pyramid shaped, having 4 faces, with one of those faces being substantially reflective, and the remaining faces being substantially less reflective. The faces may all be coated with a reflective coating, but may present different reflectivity due, for example, to different roughness levels formed in the molding process.

Figure 8:
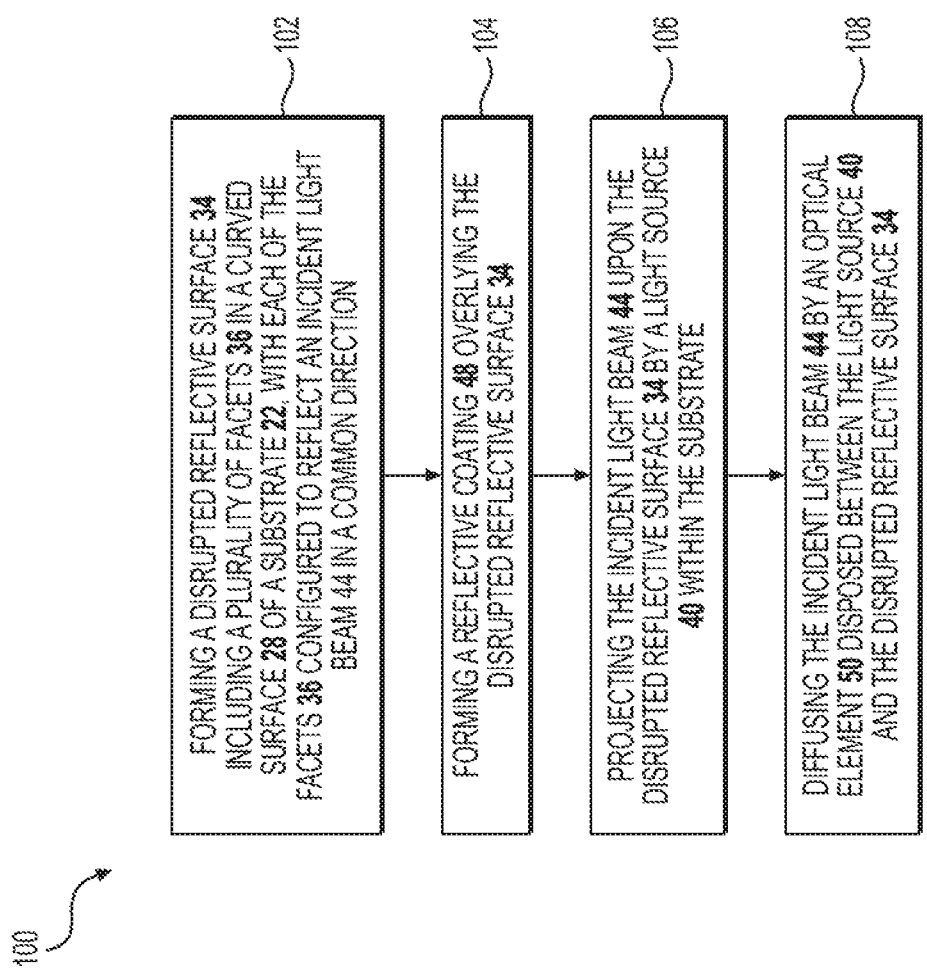
FIG. 8 is a flow chart showing steps in a method of making a trim component according to an aspect of the present disclosure.

As described in the flow charts of FIG. 8, a method 100 of making a trim component is 20 also provided. The method 100 includes forming a disrupted reflective surface 34 including a plurality of facets 36 in a curved surface 28 of a substrate 22, with each of the facets 36 configured to reflect an incident light beam 44 in a common direction at step 102.

The method 100 also includes forming a reflective coating 48 overlying the disrupted reflective surface 34 at step 104. For example, the reflective coating 48 may comprise one or more of an electroplated chrome or a Physical Vapor Deposition (PVD) coating or a hot-stamp film or an insert-molded film.

The method 100 may also include projecting the incident light beam 44 upon the disrupted reflective surface 34 by a light source 40 within the substrate 22 at step 106.

The method 100 may also include diffusing the incident light beam 44 by an optical element 50 disposed between the light source 40 and the disrupted reflective surface 34 at step 108.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A trim component comprising:
   a substrate having a 3-dimensional shape with at least one curved surface, the at least one surface defining a disrupted reflective surface;
   a plurality of facets formed over the at least one curved surface;
   at least some of the plurality of facets having different characteristics such that the plurality of facets are configured to reflect an incident light beam in a common direction toward a target;
   a reflective coating overlying the disrupted reflective surface.

2. The trim component of claim 1, wherein the facets are irregular; and
   wherein the facets are arranged in a size gradient based on a curvature of the at least one curved surface for reflecting the incident light beam in the common direction toward the target.

3. The trim component of claim 1, wherein the facets are irregular; and
   wherein the facets each have an orientation direction that is dependent on a desired diffusion of light reflected therefrom and on an orientation of a curvature of the at least one curved surface thereunder for reflecting the incident light beam in the common direction toward the target.

4. The trim component of claim 1, further including a light source configured to illuminate the disrupted reflective surface.

5. The trim component of claim 4, wherein the light source is configured to be not directly visible to a viewer.

6. The trim component of claim 4, wherein the light source is configured to be directly visible to a viewer.

7. The trim component of claim 4, wherein the light source is recessed within the substrate.

8. The trim component of claim 4, wherein the light source is a diffuse light source.

9. The trim component of claim 4, wherein the light source is a focused light source.

10. The trim component of claim 4, wherein the light source is configured to vary in at least one of intensity or color over time according to a sequence.

11. The trim component of claim 1, wherein the reflective coating comprises an electroplated chrome.

12. The trim component of claim 1, wherein the reflective coating comprises a Physical Vapor Deposition (PVD) coating.

13. The trim component of claim 1, wherein the reflective coating comprises a hot-stamp film.

14. The trim component of claim 1, wherein the reflective coating comprises an insert-molded film.

15. The trim component of claim 1, wherein the substrate comprises a material selected from a group including ABS, PC-ABS, ABS-PC, Polyamide, and Aramid.

16. A trim component comprising:
    a substrate having a 3-dimensional shape with at least one curved surface, the at least one surface defining a disrupted reflective surface;
    a plurality of facets formed over the at least one curved surface;
    at least some of the plurality of facets having different characteristics such that the plurality of facets are configured to reflect an incident light beam in a common direction toward a target; and
    a light source recessed within the substrate and configured to illuminate the disrupted reflective surface.

17. The trim component of claim 16, wherein the light source is configured to be not directly visible to a viewer.

18. The trim component of claim 16, wherein the light source is recessed within the substrate of the trim component and configured to project an incident light beam through an aperture in the trim component and upon the disrupted reflective surface.

19. The trim component of claim 16, wherein the facets are irregular; and
    wherein the facets are arranged in a size gradient based on the curvature of the at least one curved surface.

20. The trim component of claim 16, further comprising a reflective coating overlying the disrupted reflective surface.

21. The trim component of claim 20, wherein the reflective coating comprises one of an electroplated chrome or a Physical Vapor Deposition (PVD) coating or a hot-stamp film or an insert-molded film.

22. A method of making a trim component comprising:
    forming a disrupted reflective surface including a plurality of facets in a curved surface of a substrate, with at least some of the plurality of facets having different characteristics such that the plurality of facets are configured to reflect an incident light beam in a common direction toward a target; and
    forming a reflective coating overlying the disrupted reflective surface.

23. The method of claim 22, further comprising:
    projecting the incident light beam upon the disrupted reflective surface by a light source within the substrate.

24. The method of claim 23, further comprising:
    diffusing the incident light beam by an optical element disposed between the light source and the disrupted reflective surface.

25. The method of claim 22, wherein the reflective coating overlying the disrupted reflective surface comprises one of an electroplated chrome or a Physical Vapor Deposition (PVD) coating or a hot-stamp film or an insert-molded film.

* * * * *